United States Patent [19]

Bied-Charreton et al.

[11] 4,068,258
[45] Jan. 10, 1978

[54] METHOD FOR COMPRESSING THEN EXPANDING A TELEVISION SIGNAL

[75] Inventors: Philippe Bied-Charreton; Francois Le Carvennec, both of Paris, France

[73] Assignee: Thomson-Brandt, Paris, France

[21] Appl. No.: 669,471

[22] Filed: Mar. 23, 1976

[30] Foreign Application Priority Data

Mar. 28, 1975 France .................. 75.09916

[51] Int. Cl.² .............................................. H04N 5/79
[52] U.S. Cl. .......................................... 358/4; 358/15; 358/133; 360/22
[58] Field of Search ................ 358/133, 136, 12, 40, 358/4, 8, 15; 360/22

[56] References Cited

U.S. PATENT DOCUMENTS

| | | | |
|---|---|---|---|
| 2,629,010 | 2/1953 | Graham | 358/133 |
| 2,941,032 | 6/1960 | Geiger | 360/22 |
| 3,159,711 | 12/1964 | Schut | 360/22 |
| 3,366,739 | 1/1968 | Parkinson | 358/133 |
| 3,614,333 | 10/1971 | Iwata | 360/86 |
| 3,869,712 | 3/1975 | Camras | 358/4 |
| 3,872,498 | 3/1975 | Pritchard | 358/4 |
| 3,934,264 | 1/1976 | Dann | 358/8 |
| 3,938,180 | 2/1976 | Arimura | 358/8 |

OTHER PUBLICATIONS

RCA TN No.: 152; 1958.

Primary Examiner—Howard W. Britton
Attorney, Agent, or Firm—Cushman, Darby & Cushman

[57] ABSTRACT

The present invention relates to methods which make it possible to partially eliminate the redundancy in television signals. It consists in splitting the spectrum of the video signal into two parts, one containing the low frequencies, this being transmitted integrally, and the other containing the high frequencies, this being transmitted once every n times and being repeated $n-1$ times at reception.

8 Claims, 2 Drawing Figures

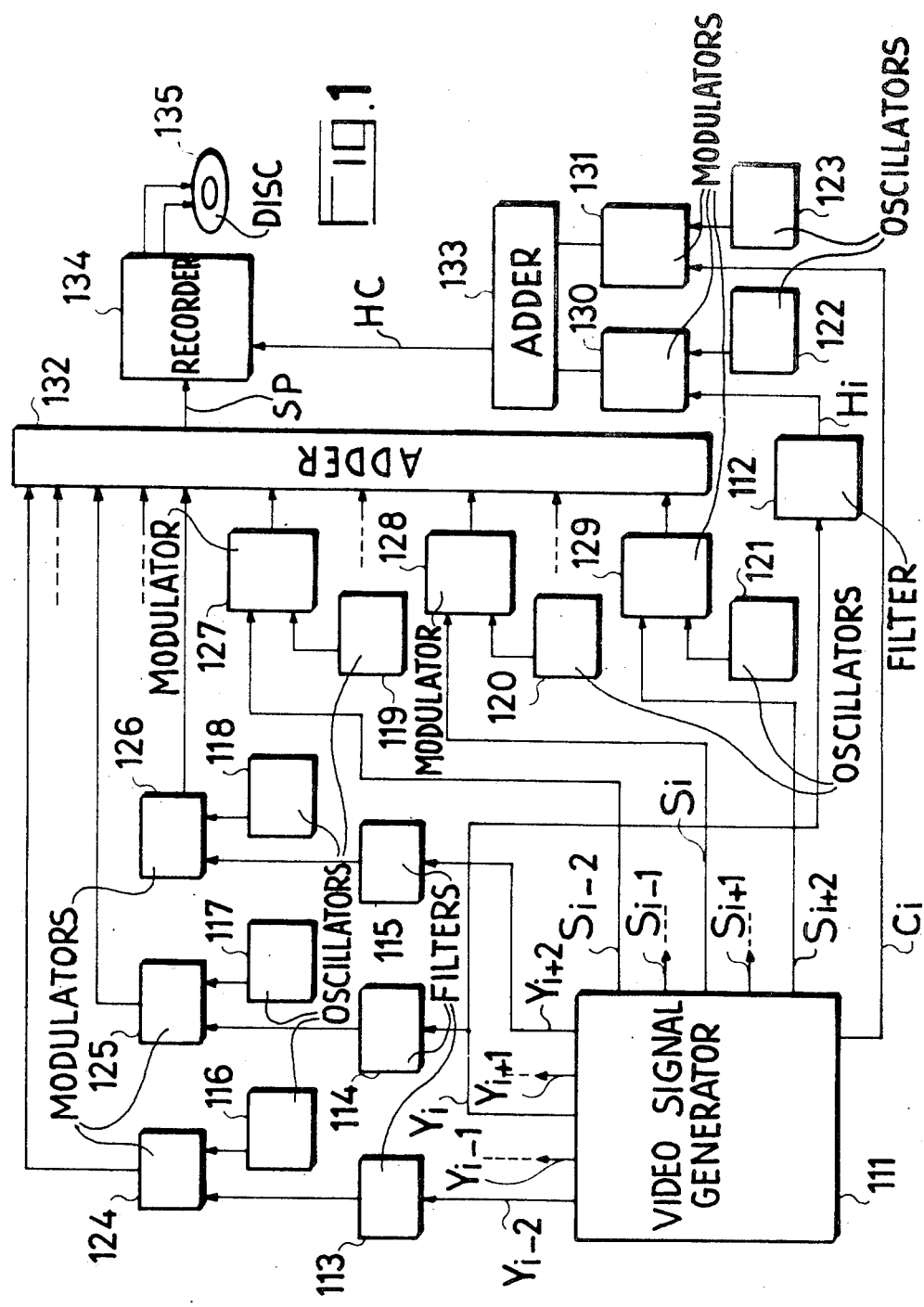

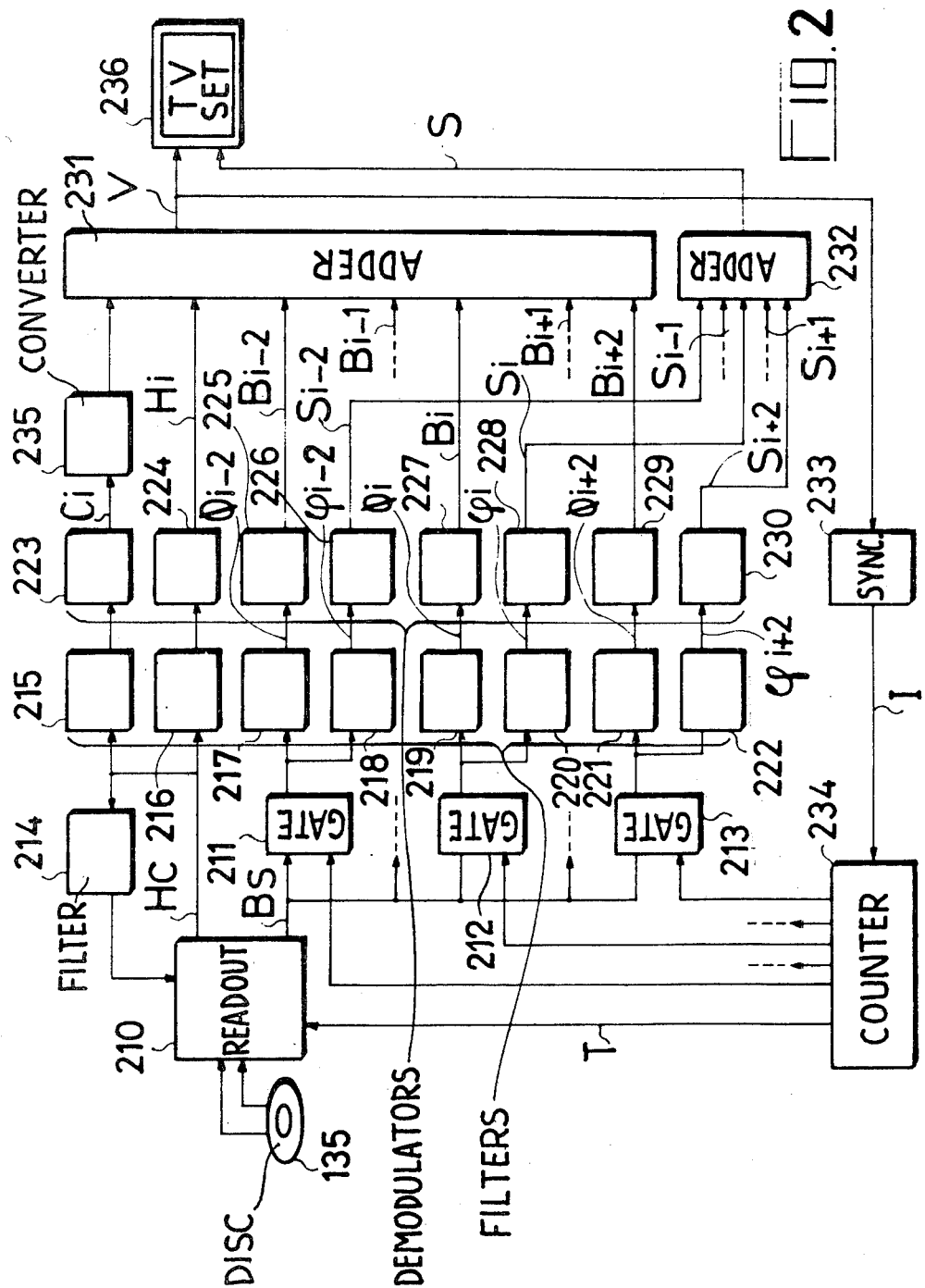

METHOD FOR COMPRESSING THEN EXPANDING A TELEVISION SIGNAL

The present invention relates to methods of carrying out compression/expansion on television signals. It relates also to the recordings and apparatus which utilise this method. It relates more particularly to methods which make it possible to record television signals of this kind on a disc. These discs are known as video discs and will continue to be so described in the remainder of this text.

Television signals exhibit a high level of redundancy. This is due to the fact that the standards utilised make it possible to transmit pictures which may be completely different from one another, and that for the majority of the time one picture differs from the preceding one by only a small amount. It is therefore necessary to transmit a quantity of information a major part of which is superfluous and to utilise for this circuits and recordings which have a wide pass band.

Attempts have been made to reduce this redundancy by various methods which can be split into two groups:

in one group, the whole of the values corresponding to the elementary points in a picture are stored and only those pieces of information are transmitted which correspond to ones which have changed in the succeeding picture. This can only be done using very substantial equipment and does not resolve the problem of complete change of a picture.

in the other groups, the basis of the approach is constituted by the subjective physiological properties of human vision and these properties are exploited in order to reduce the rate of transmission of certain components of the signal, even the complete signal in fact. These methods have not yielded satisfactory results thus far.

The method in accordance with the present invention falls into the second of these groups. It utilises the subjective physiological property of human vision, namely that in accordance with which pictures intended to portray in rapid motion can be perceived with low definition but their content has to be renewed frequently, whilst pictures translating a static state or slow motion, must be percieved with high definition although their content can be renewed less frequently. This property applies also if we consider the fixed and moving elements of one and the same scene.

The video signal representing a picture i, namely $V_i(t)$, splits into low frequency signals, namely $B_i(t)$, representing the masses of the pictorial assembly, and high frequency signals namely $H_i(t)$, representing the details contained in these masses. If, at the normal rate corresponding to the standard used, the signals $B_i(t)$ are reproduced, then the screen will show a succession of low-definition pictures which will reproduce rapid motions satisfactorily but will not exhibit sufficient detail in their fixed parts or during slow movements. If there are then added to the signals $B_i(t)$ of n successive pictures, the signals $H_i(t)$ of just one of these n pictures, then the details will have been introduced which are required to achieve correct reproduction of the fixed or slowly moving picture elements which need not be renewed so frequently.

An interesting variant embodiment of this method consists in adding to $B_i(t)$ the mean of $H_i(t)$ over said n pictures, namely $$\frac{1}{n} \sum_{1}^{n} H_i(t).$$

This makes it possible to reproduce the slow movements in a less grid fashion and to improve the signal-to-noise ratio, albeit at the expense of a loss in the very finest details.

When this method is utilised for recording, the recording $H_i(t)$ will only occur once in every n times and an increase in recording capacity will therefore result.

It is of interest to fix the frequency limit between $B_i(t)$ and $H_i(t)$ in such a fashion that the bandwidth of $H_i(t)$ is contained around n times within the band width of $H_i(t)$. This makes it possible to utilise two separate channels of the same capacity for these respective signals, the full capacity of these channels being exploited.

For colour reproduction, the chrominance signals can be treated like the high frequency signals and can accordingly be repeated just once in every n pictures, the only sacrifice here being a certain amount of desaturation and a slight amount of blur associated with rapid movements. In this case, it is also possible to multiplex the chrominance signals with the signals $H_i(t)$ extracted from the luminance signal.

In accordance with the present invention it is provided a method for compressing then expanding a television signal comprising a succession of signals $V_i$, said signals $V_i$ representing a succession of pictures marked by the index i, said method comprising the steps of:

splitting n successive signals $V_{i+1}$ to $V_{i+n}$ into respectively low frequency signals $B_{i+1}$ to $B_{i+n}$ and high frequency signals $H_{i+1}$ to $H_{i+n}$;

eliminating $n - 1$ of said high frequency signals for keeping a remaining high frequency signal $H_{i+j}$;

transmitting said signals $B_{i+1}$ to $B_{i+n}$ and $H_{i+j}$ onto a spreading channel; and reconstructing said n successive signals $V_{i+1}$ to $V_{i+n}$ by carrying out n successive sums $B_{i+1} + H_{i+j}$ to $B_{i+n} + H_{i+j}$.

For a better understanding of the invention, and to show how the same may be carried into effect, reference will be made to the ensuring description and the attached figures among which:

FIG. 1 illustrates a block diagram of a video-disc recording apparatus implementing the invention;

FIG. 2 illustrates a block diagram of a reading out apparatus for reading out such a video-disc.

The method of the invention applies in a particularly opposite way to video disc recording techniques.

In a particular embodiment, the video signal $V_i(t)$ is split into three parts, a first part $B_i(t)$ comprising the luminance signals of frequencies less than 1 MHz, a second part $H_i(t)$ comprising the luminance signals having frequencies greater than 1 MHz and less than around 5.5 MHz in the standard used, and a third part $C_i(t)$ comprising the chrominance signals coded in accordance with the standard in use and correspondingly occupying a frequency band of about 1 MHz.

The video disc used in the example in question, is not constituted by the conventional spiral recording track but by a series of circular, concentric tracks. These tracks are used in groups of two side by side. On one of these two tracks, using two sub carriers the signals $H_i(t)$ and $C_i(t)$ of the picture i are recorded. On the other track, with the help of ten sub carriers, the signals $B_{i-2}(t)$ to $B_{i+2}(t)$ of five successive pictures, these five pictures being the very picture i the two preceding ones and the two succeeding ones, and the signals $S_{i-2}(t)$ to $S_{i+2}(t)$ representing the sound for these five pictures, are recorded. It should be pointed out that in view of the position occupied in the spectrum by the audio signals, in the two channels used signals are recorded which, prior to modulation, correspond to information occupying a frequency band 5.5 MHz in width approximately.

Again, the variant has been used which consists in recording, instead of $H_i(t)$ and $C_i(t)$, the mean of these signals over the five pictures in question, these two means being:

$$\frac{1}{5} \sum_{i-2}^{i+2} H_j(t) \text{ and } \frac{1}{5} \sum_{i-2}^{i+2} C_j(t).$$

Another variant form of this procedure is to record the composite signals obtained, not on circular tracks but upon two spiral tracks recorded side by side.

In FIG. 1, a video-disc recording system in accordance with the invention has been illustrated, the drawing being limited to channels $i-2$, i and $i+2$. The system comprises a video signal generator 111, six filters including those 112 to 115, twelve sub carrier oscillators including those 116 to 123, twelve modulators including those 124 to 131, two adders 132 and 133 and a video disc recorder 134.

The video signal generator 111 is a device which makes it possible, from one or more identical recordings, to simultaneously produce luminance signals $Y_{i-2}$ to $Y_{i+2}$ for five successive pictures of a television programme, the chrominance signal $C_i$ for the middle picture and the audio signals $S_{i-2}$ to $S_{i+2}$ corresponding to these five pictures. $C_i$ is coded in accordance with the television standard which applies, but by a frequency conversion operation is brought to a frequency of between 0 and 1 MHz. In the present instance, this generator is a special telecine unit with five pick-up gates and five sound heads, but could equally well for example be a video disc with a pick-up head making it possible to read-out five pictures in parallel.

The luminance signals pass through the filters which include 113, 114 and 115, these isolating the signals $B_{i-2}$ to $B_{i+2}$ which have been frequency limited to 1 MHz. These signals frequency-modulate the sub carriers generated by the oscillators, which include 116, 117 and 118, in the modulators which include 124, 125 and 126.

The audio signals $S_{i-2}$ to $S_{i+2}$ frequency-modulate the sub carriers generated by the oscillators which include 119, 120 and 121, in the modulators which include 127, 128 and 129.

The sub carriers modulated by the signals $B_{i-2}$ to $B_{i+2}$ and $S_{i-2}$ to $S_{i+2}$ are all added in the adder 132 and the resultant composite signal BS is injected into the video-disc recorder 135 where it is recorded using a main carriage, in one of the tracks of the groups of two tracks defined earlier.

The luminance signal $Y_i$ passes through the filter 112 which isolates the frequencies higher than 1 MHz in order to obtain the signal $H_i$ this, in the modulator 130, frequency-modulating the sub carrier generated by the oscillator 122.

The chrominance signal $C_i$ in the modulator 131 frequency-modulates the sub carrier generated by the oscillator 125.

The sub carriers modulated by the signals $H_i$ and $C_i$ are added in the adder 133 and the resultant composite signal HC is supplied to the recorder 134 where it is recorded by means of a main carrier in the other of the tracks in the groups of two.

In this way a video disc 135 is obtained.

To apply the variant which involves the utilisation of the signals $$\frac{1}{5} \sum_{i-2}^{i+2} H_j \text{ and } \frac{1}{5} \sum_{i-2}^{i+2} C_j,$$

it is simply necessary to extract the signals $H_{i-2}$ to $H_{i+2}$ using filters similar to that 112, and to provide at the output of the video generator 111, the signals $C_{i-2}$ to $C_{i+2}$. The signals $H_{i-2}$ to $H_{i+2}$ are then added and the resultant signal reduced in a ratio of 1 to 5 in order to retain the correct level. The corresponding circuit is constituted for example by a five-input amplifier and a potentiometer having a ratio of 5 to 1, and we will use the term averaging device to describe it; the signal is then applied to the modulator 130. In the same way, $C_{i-2}$ to $C_{i+2}$ are averaged and the resultant signal is applied to the modulator 131.

It should be pointed out that the use of ten frequency-staggered sub carriers which then modulate a main video disc carrier, can give rise to cross-modulation problems. A simple method of overcoming these difficulties is to group these sub carriers in order to modulate intermediate sub carriers. For example, the five sub carriers for the signals $B_i$ modulate one intermediate sub carrier and the five sub carriers for the signals $S_i$ modulate another, the two intermediate sub carriers then modulating the main carrier.

In FIG. 2, a system for reading out a video disc in accordance with the invention has been shown. This system comprises a video disc pick-up 210, five analogue gates including those 211, 212 and 213, thirteen filters including those 214 to 222, twelve demodulators including 223 to 230, two amplifier-adders 231 and 232, a sync. signal extractor device 233, a counter 234, a frequency converter 235 and a television set 236.

The video disc 135 is read out by the pick-up unit 210. The pick-up unit is equipped with a special pick-up head which makes it possible to read two adjacent tracks. For this purpose, the two tracks are separately illuminated by a known optical device similar to that described in French Pat. application No. 73 24 004. The two light beams diffracted by the recordings contained in the tracks, are picked up by an objective lens which forms an image of them on two photodetector devices which supply the read-out information. The pick-up unit derives from these pieces of information the composite signals HC and BS by demodulating the main carriers.

With each read-out of a pair of tracks, the signal HC is filtered in the filter 216 which extracts the sub carrier modulated by the signal $H_i$ (high frequencies of the luminance component). This sub carrier is demodulated in the demodulator 224 which furnishes $H_i$, the latter then being applied to the adder 231.

Similarly, with each read-out of a pair of tracks, the filter 215 extracts the sub carrier modulated by the signal $C_i$ (coded chrominance component). This sub carrier is demodulated in the demodulator 223 which furnishes $C_i$; $C_i$ is then changed in frequency in the frequency-changer 235 to bring it back into correspondence with the television standard used, and is then applied to the adder 231.

At the time of first read-out of a pair of tracks, the signal BS passes through the gate 211 which is opened by the counter 234. The filter 217 extracts from BS the sub carrier $\phi_{i-2}$ (low frequencies of the luminance component). This sub carrier is demodulated in the demodulator 225 which furnishes $B_{i-2}$, the latter then being applied to the adder 231.

The adder 231 therefore supplies a complete video signal $V = V_{i-2} = H_i + B_{i-2} + C_i$ to the television set 236.

At the same time, on the first occasion of read-out of a pair of tracks, the filter 218 extracts from BS the sub carrier $\phi_{i-2}$ modulated by $S_{i-2}$ (sound corresponding to picture $i-2$). This carrier is demodulated in the demodulator 226 which furnishes $S_{i-2}$, the latter then being applied to the adder 232.

The adder 232 therefore delivers the sound signal S to the television set 236.

The field sync. signal extractor device 233 extracts from the signal $V_{i-2}$ a spike sync. pulse which causes the counter 234 to advance by one unit. This counter then closes the gate 211 and opens the next gate, thus enabling the signals $B_{i-1}$ and $S_{i-1}$ to be demodulated in order to obtain the signal $V_{i-1}$.

The same process is carried out for the pictures i, i+1 and i+2. At the end of picture i+2, the counter 234 applies an advance spike pulse T to the pick-up unit 210 and resets itself to zero, closing the gate 213 and opening the gate 211 again for the commencement of the next sequence. When detecting the arrival of T, the pick-up unit 210 advances its pick-up head in order to read the next pair of tracks.

If the recording on the disc employs the variant with two side by side spiral tracks then the pick-up unit 210 operates normally in the "repetitive read-out" mode and the spike pulse T has the effect of temporarily inhibiting this mode after four repetitions.

It is essential that the read-out should the positioned correctly and remains thus positioned, in order to make available the signals HC and BS in the corresponding processing circuits. To do this, the filter 214 which is a very narrowband filter, detects the presence upon the line normally corresponding to the signal HC, of one of the carriers contained in the signal BS. In this situation, the signal thus detected is transmitted to the pick-up unit 210 which corrects the position of its pick-up head accordingly. Another solution would be to leave the pick-up head in the same position and to effect switching between the two output signals from the pick-up head, using electronic or electromechanical means (relays for example).

A variant embodiment of this system would be to utilize a variable number of repetitions and to arrange for one of the carriers $\phi_i$ or $\phi_j$ to carry a coded signal resetting the counter 234 to zero.

What we claim is:

1. A method for compressing a colour and sound television signal comprising a succession of signals $V_i$ and $S_i$, said signal $V_i$ representing a succession of pictures marked by the index i, and said signal $S_i$ representing sounds corresponding to said pictures, said method comprising the steps of:
   splitting n successive signals $V_{i+1}$ to $V_{i+n}$ into respectively low-frequency signals $B_{i+1}$ to $B_{i+n}$, high frequency signals $H_{i+1}$ to $H_{i+n}$, and chrominance signals $C_{i+1}$ to $C_{i+n}$;
   eliminating $n-1$ of said high frequency signals and $n-1$ of said chrominance signals for keeping respectively a remaining high frequency signal $H_{i+j}$ and a remaining chrominance signal $C_{i+j}$;
   frequency multiplexing said signals $H_{i+j}$ and $C_{i+j}$ for providing a first multiplexed signal, and said signals $B_{i+1}$ to $B_{i+n}$ and $S_{i+1}$ to $S_{i+n}$ for providing a second multiplexed signal; and
   recording said first and second multiplexed signals onto a recording presenting a first and second paths, said first and second multiplexed signals being respectively recorded on said first and second paths.

2. A method as claimed in claim 1, wherein the number n is strictly less than 6.

3. An apparatus for compressing and recording a television program, said program comprising a succession of pictures marked by the index i, said apparatus comprising:
   means for providing from n successives i+1 to i+n of said pictures simultaneously n luminance signals $Y_{i+1}$ to $Y_{i+n}$, n audio signals $S_{i+1}$ to $S_{i+n}$, and one chrominance signal $C_{i+j}$;
   means for filtering said luminance signals, providing low-frequency signals $B_{i+1}$ to $B_{i+n}$;
   means for modulating a first set of n sub-carriers by said low frequency signals, providing a first set of modulated sub-carriers;
   means for modulating a second set of n sub-carriers by said audio signals, providing a second set of modulated sub-carriers;
   means for adding said first and second sets of modulated sub-carriers, providing a first video signal;
   means for filtering one of said luminance signals, providing a high frequency signal $H_{i+j}$;
   means for modulating a first single sub-carrier by said high frequency signal, providing a first modulated single sub-carrier;
   means for modulating a second single sub-carrier by said chrominance signal, providing a second modulated single sub-carrier;
   means for adding said first and second modulated single sub-carriers, providing a second video signal, and
   means for recording onto a recording said first and second video signal.

4. An apparatus as claimed in claim 3, wherein said means for recording comprises a video-disc recorder.

5. An apparatus for compressing and recording a television program, said program comprising a succession of pictures marked by the index i, said apparatus comprising:
   means for providing from n successive i+1 to i+n of said pictures simultaneously n luminance signals $Y_{i+1}$ to $Y_{i+n}$, n audio signals $S_{i+1}$ to $S_{i+n}$, and n chrominance signals $C_{i+1}$ to $C_{i+n}$;
   means for filtering said luminance signals, providing low frequency signals $B_{i+1}$ to $B_{i+n}$;
   means for modulating a first set of n sub-carriers by said low frequency signals, providing a first set of modulating sub-carrieers;
   means for modulating a second set of n sub-carriers by said audio signals, providing a second set of modulated sub-carriers;
   means for adding said first and second sets of modulated sub-carriers, providing a video signal;
   means for filtering said luminance signals, providing high frequency signals $H_{i+1}$ to $H_{i+n}$;
   means for summing said high frequency signals, providing an averaged high frequency signal;

means for summing said chrominance signals, providing an averaged chrominance signal;

means for modulating a first single sub-carrier by said averaged high frequency signal, providing a first modulated signal sub-carrier;

means for modulating a second single sub-carrier by said averaged chrominance signal, providing a second modulated single sub-carrier;

means for adding said first and second modulated single sub-carriers, providing a second video signal; and means for recording onto a recording said first and second video signal.

6. An apparatus as claimed in claim 5, wherein said means for recording comprises a video-disc recorder.

7. An apparatus for reproducing and expanding a compressed television program recorded onto a recording, said recording bearing at least two tracks, said apparatus comprising:

reading means for reading out simultaneously said two tracks in a repetitive manner under the control of a first control signal and in a predetermined order under the control of a second control signal;

means for filtering said first video signal, providing a first and a second modulated single sub-carriers;

means for demodulating said first modulated sub-carrier, providing a high frequency signal $H_i$;

means for demodulating said second modulated single sub-carrier, providing a chrominance signal;

means for frequency translating said chrominance signal into a standard chrominance signal $C_i$;

means for directing, under the control of a set of control signals, said second video signal in one of n connections;

filtering means connected to said connections, providing a succession of pairs of sub-carriers pertaining respectively to a first and a second sets of modulated sub-carriers;

means for demodulating said sub-carriers of said first set of modulated sub-carriers, providing successively low frequency signals $B_{i+1}$ to $B_{i+n}$;

means for modulating said sub-carriers of said second set of modulated sub-carriers, providing successively sequential audio signals $S_{i+1}$ to $S_{i+n}$;

means for adding said signals $H_i$, $C_i$ and $B_{i+1}$ to $B_{i+n}$, providing a succession of expanded video signals $H_i + B_{i+1} + C_i$ to $H_i + B_{i+n} + C_i$;

means for collecting said sequential audio signals, providing a reconstructed audio signal;

sync. means for extracting from said expanded video signals frame sync. pulses;

counting means for providing said first control signal and said set of control signals; said counting means receiving from said sync. means said frame sync. pulses, and;

means for identifying one of said first and second video signals, providing said second control signal.

8. An apparatus as claimed in claim 7, wherein said reading means comprises a video-disc pick-up unit.

* * * * *